Figure 1:
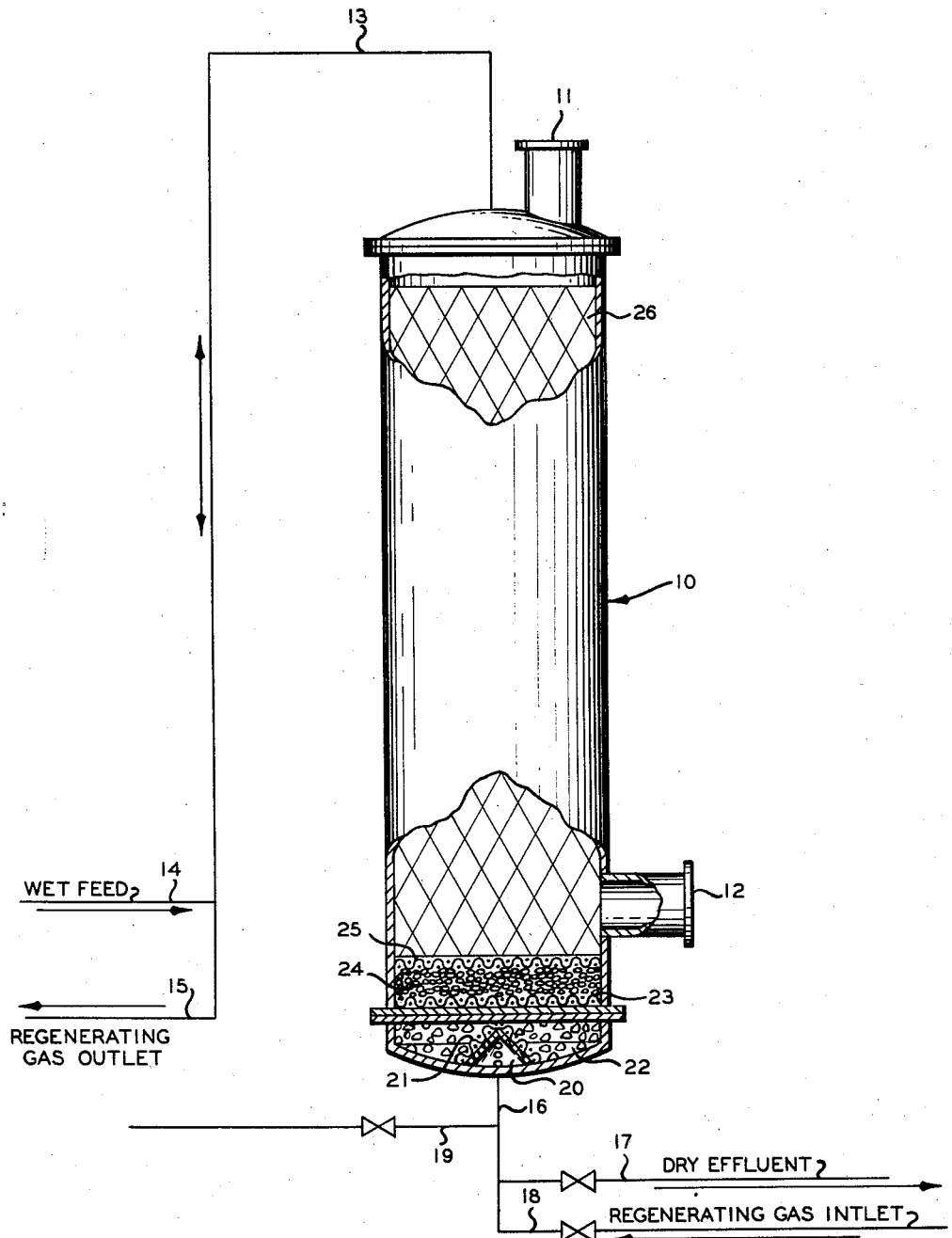

Oct. 27, 1959 C. MATYEAR, JR 2,910,139
DRYING OF GASES
Filed April 3, 1957 2 Sheets-Sheet 1

INVENTOR.
CHARLES MATYEAR, JR
BY
Hudson + Young
ATTORNEYS

INVENTOR.
CHARLES MATYEAR, JR.
BY
Hudson & Young
ATTORNEYS

2,910,139

DRYING OF GASES

Charles Matyear, Jr., Bartlesville, Okla., assignor to Phillips Petroleum Company, a corporation of Delaware Application April 3, 1957, Serial No. 650,459

9 Claims. (Cl. 183—114.2)

This invention relates to drying of gases. In one of its aspects, the invention obtains very dry gases, i.e., gases of very low dew points or temperatures, by passing said gases through a first contact zone containing one of the usual drying agents such as bauxite, silica gel, activated alumina, and the like, and then directly without intervening treatment, passing the gaseous effluent through a second contact zone containing molecular sieve. In another of its aspects, the invention provides for the utilization of the conventional drying agents or contact masses and molecular sieve material each under optimum conditions, thus effecting considerable savings while obtaining improved results by placing the conventional and the molecular sieve drying materials into one zone or vessel in contiguous relationship.

Molecular sieve materials are composed of crystalline sodium and calcium alumino-silicates which have been heated to remove their water of hydration. The crystals obtained upon dehydration are highly porous, the pores having molecular dimensions of the order of 15–20 billionths of an inch in diameter and of substantially uniform size.

Expectedly, these relatively new materials are more expensive than the conventional drying masses. Therefore, their use on a large scale can present a substantial cost item which tends to affect their use to obtain the excellent results in drying which can be obtained with them.

An object of this invention is to dry a gas. Another object of this invention is to provide a method and apparatus structure for the drying of a gas making efficient or optimum use of both a conventional drying contact mass or agent and a molecular sieve material such as those described herein or ones similar thereto. A further object of the invention is to provide a combination of a conventional drying mass and molecular sieve material which will be relatively cheaper than the molecular sieve material required to do the same drying work, yet will give the same ultimate results. A further object of the invention is to provide a process for the selective separation or adsorption of vapors and/or gases.

Other aspects, objects, as well as the several advantages of this invention, are apparent from this specification, the drawing and the appended claims.

According to the present invention, there are provided a method and apparatus wherein a gas to be dried or dehydrated is passed consecutively through a conventional drying mass and a molecular sieve material. The conventional and sieve materials are so placed in the apparatus that the gas passes directly from the conventional material to the sieve material, without any intermediate or intervening step or treatment such as cooling, etc. The invention will now be more fully described in connection with the drying of ethylene gas to free it from water vapor before it is fed to a demethanizer tower in an ethylene plant. The sieve material used in the description of the said plant is known in the trade as Linde Type 5A Molecular Sieve and has the chemical nature above-described. Bauxite is used in the following description of said plant. It will be understood that other types of sieve materials, and/or other conventional drying masses, can be substituted for those whose use is about to be described.

Below about 30 percent relative humidity molecular sieve materials, as here used, have a higher capacity for water than, for example, the conventionally used silica gel or activated alumina. This margin increases as the relative humidity decreases. This invention makes use of the foregoing fact since the use first of a conventional adsorbent to remove water from the gas brings it within the range of relative humidity at which a relatively small amount of the sieve material or compound with the amount of conventional adsorbent, will most effectively complete the drying of the gas. Thus, the invention uses both types of adsorbent to best or optimum advantage. It is possible for each drying operation to determine the relative amounts of the conventional and sieve material giving optimum results consistent with cost.

Figure 2:
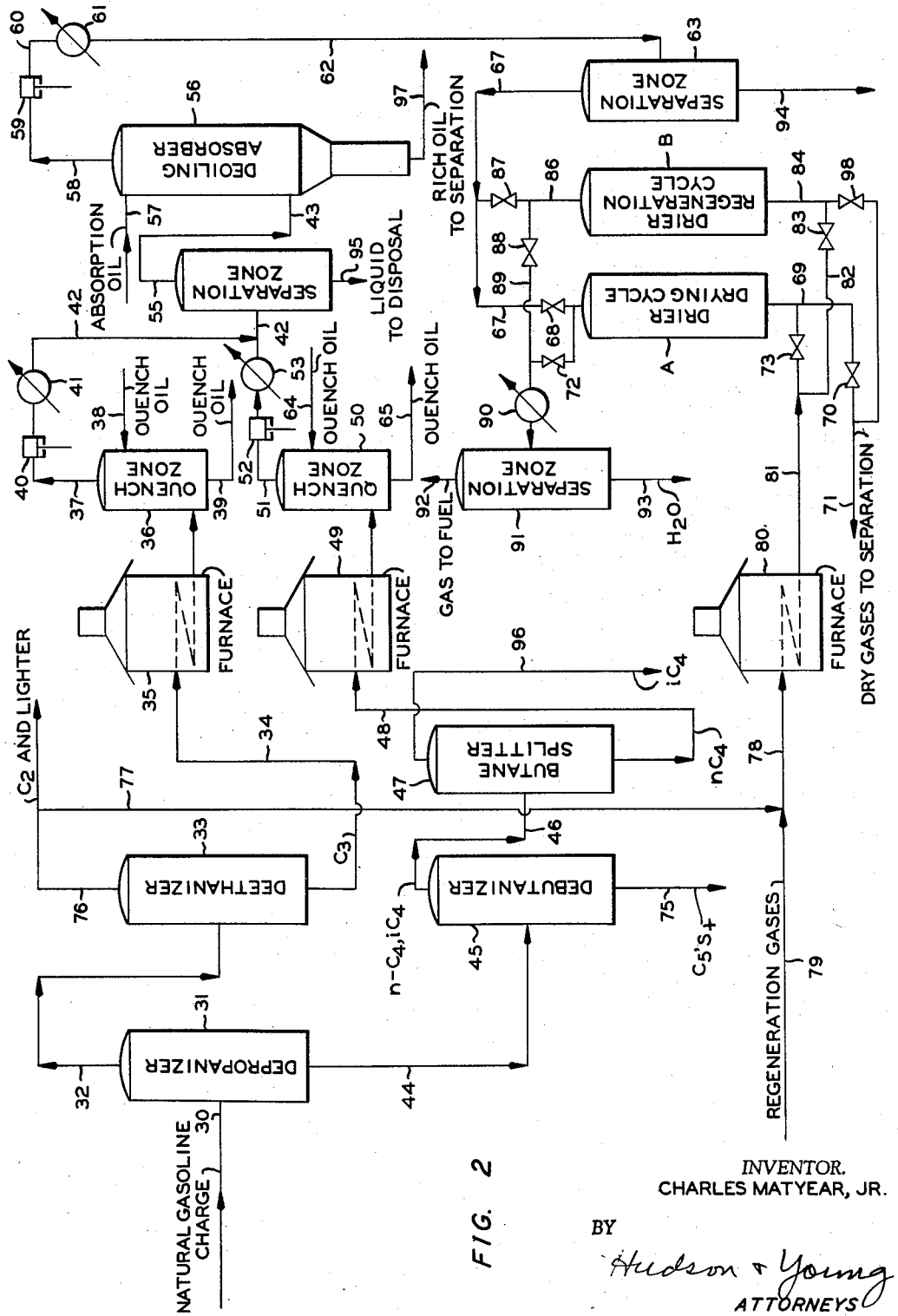

In Figure 1 of the drawing, there is shown a cross-sectional view of a vessel containing two adsorbent materials as described herein. In Figure 2 is shown an operation for the production of ethylene-containing gases in which the drying operation of the invention has been incorporated together with additional inventive concepts.

Referring to Figure 1 of the drawing, 10 represents a vessel in which a water or water vapor-containing hydrocarbon fluid is contacted with adsorbents. 11 is a manhole and 12 is a manhole for filling and emptying the vessel. 13 is an inlet for wet feed 14 on the drying cycle. It is an outlet for regenerating gas 15 on the regeneration cycle. Conduit 16 is an outlet for dried material 17 on the drying cycle or an inlet for regeneration gas 18 on the regeneration cycle. Line 19 represents a sampling point. 20 is a conical or suitably shaped perforated metal, or the like, member to prevent solids from leaving the chamber with the dried effluent. Around piece 20 is screen material 21 of a mesh size which prevents passage of solids therethrough. The bottom end of the vessel is filled with a support material 22 such as crushed fire brick, gravel, etc.

On top of 22 is laid a pad means 23 which is, in this specific example, a 2-inch thick wire mesh pad of void size to prevent passage of solids 24 therethrough. Other materials of construction can be used, it being necessary that said materials are non-reactive to the materials in the system, and are capable of retaining solids thereon, allowing fluid to flow therethrough. The solids material placed on pad 23, in this case, is, as stated, a molecular sieve material known in the art as Linde Type 5A Molecular Sieve. Upon the bed of the sieve, which is 6 inches deep, I place a second pad 25 of a similar structure as pad 23. This upper pad 25 prevents mixing of solids 24 and solids 26 which fill the tower to the top, and can be any conventional solids for drying such as bauxite, activated alumina, silica gel, and the like, relatively inexpensive water-removing solids. In this example, bauxite is used.

Vessel 10 is an upright cylinder about 6 feet in diameter and 20 feet high. The pads 23 and 25 are about 2 inches thick covering the entire vessel cross-section. The molecular sieve is usually between about 1 inch to 10 inches or more in thickness, in this example it is about 6 inches for economy and process purposes. The remainder of the column is filled with the relatively inexpensive adsorbent, bauxite.

In the operation described, a water vapor- and ethylene-containing gas is to be fed as dry as possible to a demethanizer of an ethylene manufacturing plant in order to substantially eliminate freeze-ups. The compressed, cooled cracked gas from a cracking furnace in which hydrocarbon has been cracked at elevated temperature to produce said ethylene-containing gas, saturated with water vapor, at a dew point of about 60° F. is charged to vessel 10 via lines 14 and 13. The dried effluent (demethanizer feed) leaves vessel 10 at a dew point of about −130° F., at the system pressure. The pressure in the vessel 10 is about 500 p.s.i.g. with a temperature of 70° F. The charge 13 thereto is 20,000,000 s.c.f./day. The pressures employed in other gas drying operations can range from 0 to 1000 p.s.i.a., or more, and the temperatures can range from 40 to about 150° F., or somewhat higher. The molecular sieve can be heated to 600° F. or even higher with no appreciable bad results. Various rates of flow (s.c.f./day) may be used.

The charge gases to the driers are usually saturated with water vapor and the dew points may be upwards of 150° F. However, the same low final dew point is attained when using my invention.

Prior to a rise in the desired effluent dew point, the system is regenerated and a second similar vessel is used to dry the gas.

Regeneration of both the molecular sieve and the solid adsorbent is accomplished with the same regeneration gases. Such gases are known in the art and must be substantially dry for best results. In the operation described, I use a portion of the dry residue gas from the demethanizer heated to effect regeneration of the solids between about 250° and 600° F. The pressure used for regeneration is usually above about atmospheric and depends on ultimate use of the regeneration gas effluent. I charge such gas to fuel gas at about 15 p.s.i.g. However, pressures broadly can range from 0 to several hundred pounds per square inch (gauge). In some instances, vacuum can be employed.

The regeneration gas is passed through the vessel 10 until the solids are substantially dried, usually requiring about 8 hours. The regeneration gas is passed through for an additional period, the gas now not being heated, to cool down the solids in 10. The unit is now available for the drying cycle.

When employing bauxite only in the drier with the same charging gas and under the same conditions as above, the effluent gas measured a dew point of −60° F. as against the dew point of about −130° F., earlier noted.

It is seen that the system of my invention produces a drier effluent gas than is conventionally produced which obviously minimizes freeze-ups in my operation. The time between regeneration cycles is also lengthened which is an economical advantage.

Although in the drawing and the specific example of one operation according to the invention there is shown a downflow arrangement in which the gas last contacts the sieve material at the foot of tower 10, it is possible within the scope of the invention to use upflow and to place the sieve material at the top of the tower. The exact sequence of filling of the tower will depend, at least in part, upon which adsorbent is most frequently replaced due to pickup of impurities, etc. Also, due to momentary irregular operation or change of moisture content of the feed to the tower, there may be obtained excessive wetness which may compact the drying medium. In such cases, the downflow operation may not be preferred to the upflow operation if the gas pressure will be relied upon to prevent or to minimize the compacting of the drying medium. In any event, the gases in the preferred form of the invention will pass through a tower in which the two drying mediums are contiguous except for a screen or grid to prevent settling of smaller particles of the one material into interstices formed by the particles of the other. In some cases, the screens or grids can be dispensed with.

Although the invention has been illustrated with respect to drying ethylene, it is within the scope of the claims to dry air or other gaseous or vaporous materials. Thus, normally liquid materials can be vaporized and passed through the apparatus or merely percolated therethrough as liquids. In such cases, the separations can involve selective adsorption as well as the removal of moisture. Hydrocarbons other than ethylene can be dehydrated. For example, acetylenes, other olefins or diolefins such as propylene and butadiene, and others, as well as entire fractions of hydrocarbons, whether natural or synthetic, can be treated according to the invention. Also, there can be combined in the steps of the invention a selective adsorption process in which, say, silica gel or activated carbon and molecular sieve materials are used together in tandem.

Referring now to Figure 2, a natural gasoline charge containing $C_2$, $C_3$, $C_4$, $C_5$ and heavier hydrocarbons is passed by pipe 30 to depropanizer 31 wherein $C_3$ and lighter hydrocarbons are separated from heavier hydrocarbons. $C_3$ and lighter hydrocarbons are taken overhead by way of pipe 32 and deethanized in tower 33. The overhead from deethanizer 33, which is composed of $C_2$ and lighter hydrocarbons, can be removed from the operation or passed by way of pipe 77 as at least a portion of regeneration gases to be used as later described. A stream consisting essentially of propane is withdrawn from deethanizer 33 and passed by way of pipe 34 to ethylene-producing cracking furnace 35 in which propane is cracked under ethylene-producing conditions to produce a cracked effluent comprising ethylene. The conditions in this furnace are well-known in the art and do not form a part of this invention. Suffice to say that the charge remains in the furnace for a matter of seconds at temperatures well in excess of 1000° F. From furnace 35, the cracked effluent is passed to quench zone 36 in which the effluent is quenched with quench oil introduced by pipe 38 and removed by pipe 39. The quenched gases leave zone 36 by pipe 37, are compressed by means of compressor 40, and passed by way of cooler 41 and pipe 42 to liquid separation zone 43. Returning to depropanizer 31, bottoms consisting essentially of butanes and heavier are passed by pipe 44 into debutanizer 45. Bottoms consisting essentially of $C_5$ hydrocarbons and heavier are removed from the operation by pipe 75. Overhead consisting essentially of iso and normal butanes is passed by way of pipe 46 to butane splitter 47 from which isobutane is taken overhead and removed from the system by pipe 96. Bottoms from splitter 47 consisting essentially of normal butane are passed by pipe 48 to ethylene-producing cracking furnace 49 in which conditions, as will be recognized by those skilled in the art, are somewhat different from those in furnace 35. The conditions in furnace 49 do not form a part of this invention. Suffice to say, the butane remains in there but a few seconds and is cracked at temperatures well in excess of 1000° F. to produce an effluent-containing ethylene which is passed to quench zone 50 in which it is quenched by quench oil introduced through pipe 64 and withdrawn through pipe 65. The quenched gases are passed by way of pipe 51, compressor 52, cooler 53 and pipe 42 into liquid separation zone 43. From liquid separation zone 43, the gases are passed by way of pipe 55 to deoiling adsorber 56 wherein with the aid of adsorption oil introduced by pipe 57, the gases are deoiled. The oil in the gases results from the cracking of them in the furnaces 35 and 49. Rich adsorption oil is removed from the foot of adsorber 56 and from the system by way of pipe 97. Deoiled gases are passed by pipe 58, compressor 59, pipe 60, cooler 61, pipe 62 to liquid separation zone 63. Gases free from liquid are passed by pipe 67, valve 68 into dryer A. The details of dryer A and the conditions of its operation, in this operation, are substantially as described in connection with Figure 1. From dryer A, the dried gases, which now have an extremely low dew point of the order of −130° F., are passed by way of pipe 69, valve 70, and pipe 71 to further separation and utilization. While dryer A is on drying cycle, valves 72 and 73 are closed. Dryer B, which is on regeneration cycle, is regenerated as follows: regeneration gases introduced by way of pipe 79 are passed by way of pipe 78 through furnace 80, pipe 81, 82 and valve 83 by way of pipe 84 into dryer B. The hot gases which are at a temperature well above 250° F. pass upwardly through dryer B, contacting first the molecular sieve material of the invention and then the conventional adsorbent. The moisture-laden gases are taken overhead by way of pipe 86, valve 88, pipe 89, cooler 90 to liquid separation zone 91, from which liquid-free gases are passed from the system by way of pipe 92 to fuel utilization or for other purposes which, according to the invention, can include recycle to the system by way of pipe 79. Liquid is removed from each of separation zones 43, 63 and 91 by way of pipes 95, 94 and 93, respectively.

As a feature of the invention, deethanizer overhead is passed by way of pipes 76 and 77 to pipe 78 to constitute at least a portion, if not all, of the gases used in dryer B undergoing regeneration. When dryer B is on regeneration cycle, valves 87 and 98 are closed. Obviously, when dryer B is on absorption, dryer A can be on regeneration cycle. Additional dryers can be provided.

Molecular sieve materials which may be used in my process are usually comprised of sodium, calcium, aluminum, silicon, and oxygen, and are a structure of definite crystalline pattern containing a large number of small cavities connected by a number of smaller pores. These pores and cavities are normally uniform in size and comprise about 50 percent of the total volume of the crystals. Such sieve materials applicable in the invention are various naturally occurring zeolites or synthetic zeolites. Applicable materials are the various crystalline alumino-silicates which have been heated to remove water of hydration. Of the three classes of crystalline zeolites, fibrous, laminar, and rigid three dimensional anionic networks, the last mentioned class only is suitable in my invention. Examples of such materials include chabazite, phacolite, gmelinite, harmotome, and the like, or suitable modifications thereof. The particular sieve used in the example of my invention is known to those skilled in the art as Linde Molecular Sieve Type 5A. Of course, other pore size sieves may be used, e.g., 4 Angstrom up to, say, 13 Angstrom size.

Reasonable variation and modification are possible within the scope of the foregoing disclosure, the drawing and the appended claims to the invention, the essence of which is that a gas to be dried is passed through a drying zone or apparatus, first contacting a conventional drying medium and then contacting a molecular sieve drying medium, the gas being passed directly without intermediate or intervening treatment of any kind from the conventional drying medium to the molecular sieve material preferably leaving the conventional drying medium at a relative humidity sufficiently low to utilize to best advantage the ability of a molecular sieve material to remove moisture from said gas more efficiently, and to hold more moisture, at low relative humidities than is possible with the conventional drying medium, thus, effecting great savings in regeneration time, obtaining longer "on stream" times between regenerations, shortening regeneration heating and cooling times and reducing the size of the apparatus, all the while saving costs by using the two steps employing the two adsorbents, one conventional, in a first step, and the sieve material in the second step.

I claim:

1. A method for removing moisture from a gas containing the same which comprises passing said gas through a zone containing a large quantity of a non-molecular sieve adsorbent conventionally used to remove said moisture from said gas, thus partially dehydrating said gas, then passing said gas through another zone containing a small quantity of molecular sieve material, thus substantially completing the dehydration of said gas, and then recovering said gas from which said moisture has been removed.

2. A method for removing moisture from a gas containing the same which comprises passing said gas through a zone containing a non-molecular sieve adsorbent conventionally used to remove said moisture from said gas, thus partially dehydrating said gas, then, without any intervening intermediate step of treatment, passing said gas through another zone containing a molecular sieve material, thus completing the dehydration of said gas, and then recovering said gas from which said moisture has been removed.

3. A method for dehydrating a gas which comprises passing said gas into contact with a non-molecular sieve conventional adsorbent adapted to adsorb moisture therefrom, maintaining said gas in contact with said adsorbent until the dew point of said gas is as low as can be practically obtained, then passing said gas into contact with a molecular sieve dehydrator material so as to reduce its dew point to a desired value and then recovering said gas from said material.

4. A method for dehydrating a hydrocarbon gas which comprises passing said gas containing a substantial amount of moisture into contact with a non-molecular sieve conventional dehydrating agent and then, without intermediate treatment, into contact with a molecular sieve material.

5. A method according to claim 4 wherein the agent is selected from the group consisting of silica gel, activated alumina, bauxite, and activated carbon.

6. A method according to claim 4 wherein the gas dehydrated is selected from the group consisting of ethylene, propylene, acetylene and butadiene.

7. A method according to claim 4 wherein the molecular sieve material is a crystalline alumino-silicate.

8. A method for dehydrating a gas which comprises passing said gas into contact with a bed composed of the following adsorbents in contiguous juxta-position in the line of flow, a non-molecular sieve conventional adsorbent and a molecular sieve dehydrator adsorbent so as to reduce its dew point to a desired value and then recovering said gas from said bed.

9. A method of producing an ethylene-containing gas having a low dew point which comprises processing a hydrocarbon gas stream containing hydrocarbons which are convertible to ethylene, separating said gas into two portions, a portion containing said hydrocarbons convertible to ethylene and another portion, passing said portion-containing gases convertible to said ethylene to a cracking zone and therein converting said hydrocarbons to ethylene, obtaining an effluent-containing ethylene, passing said effluent through a zone containing a non-molecular sieve conventional adsorbent and maintaining said effluent in contact with said adsorbent until the dew point of said effluent is as low as can be practically obtained, then passing said effluent into contact with a molecular sieve dehydrator material so as to reduce its dew point to a low desired value and then passing said effluent to ethylene recovery; passing said another portion to a preheating zone, therein heating said another portion to a temperature well in excess of that required to dehydrate said conventional adsorbent and said sieve dehydrator material and then passing said another portion to said zone into contact respectively with said molecular sieve dehydrator material and said conventional adsorbent so as to cause regeneration of said material and said adsorbent.

(References on following page)

References Cited in the file of this patent

UNITED STATES PATENTS

| | | |
|---|---|---|
| 1,414,194 | Levy | Apr. 25, 1922 |
| 1,610,288 | Jones et al. | Dec. 14, 1926 |
| 2,818,137 | Richmond et al. | Dec. 31, 1957 |

OTHER REFERENCES

"Adsorption," by C. L. Mantell, McGraw-Hill Book Co., New York, first edition, 1945, page 271.

"Crystalline Zeolites. (I) The Properties of a New Synthetic Zeolite, Type A," Journal of the American Chemical Society, volume 78, No. 23, December 8, 1956, page 5966.